United States Patent
Scheiermann et al.

(10) Patent No.: US 9,896,876 B2
(45) Date of Patent: Feb. 20, 2018

(54) DEVICE AND METHOD FOR DETERMINING THE CLOSING STATE OF A HOUSE DOOR OR OF A HOUSE WINDOW

(71) Applicant: Robert Bosch GmbH, Stuttgart (DE)

(72) Inventors: Sergej Scheiermann, Stuttgart (DE); Frank Schindler, Reutlingen (DE); Julian Batholomeyczik, Reutlingen (DE); James Njikam Mofen, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 62 days.

(21) Appl. No.: 14/902,798

(22) PCT Filed: Jun. 23, 2014

(86) PCT No.: PCT/EP2014/063154
§ 371 (c)(1),
(2) Date: Jan. 4, 2016

(87) PCT Pub. No.: WO2015/000731
PCT Pub. Date: Jan. 8, 2015

(65) Prior Publication Data
US 2016/0168899 A1   Jun. 16, 2016

(30) Foreign Application Priority Data
Jul. 4, 2013   (DE) .................. 10 2013 213 104

(51) Int. Cl.
*G08B 13/08*   (2006.01)
*E05F 15/77*   (2015.01)
(Continued)

(52) U.S. Cl.
CPC ............. *E05F 15/77* (2015.01); *E05F 5/02* (2013.01); *E05F 15/40* (2015.01); *E06B 7/28* (2013.01);
(Continued)

(58) Field of Classification Search
CPC .......................... G08B 13/08; B60J 5/101
(Continued)

(56) References Cited

U.S. PATENT DOCUMENTS 6,100,658 A * 8/2000 Kume ................... B60J 7/0573
                                                          318/266
7,113,091 B2   9/2006 Script et al.
(Continued)

FOREIGN PATENT DOCUMENTS

CN   1205045 A     1/1999
CN   201228506 Y   4/2009
(Continued)

OTHER PUBLICATIONS

International Search Report for PCT/EP2014/063154, dated Sep. 19, 2014.

*Primary Examiner* — Fabricio R Murillo Garcia
(74) *Attorney, Agent, or Firm* — Norton Rose Fulbright US LLP; Gerard Messina

(57) ABSTRACT

A method for ascertaining a closing state of a house door or of a house window, having the following method steps: acquisition of a rate of rotation of the house door or of the house window using a first acquisition device, and calculation of an opening angle of the house door or of the house window on the basis of the acquired rate of rotation, and ascertaining whether the calculated opening angle falls below a prespecified angular threshold value; acquisition of a rate of vibration of the house door or of the house window using a second acquisition device, and ascertaining whether
(Continued)

the acquired rate of vibration exceeds a prespecified rate of vibration threshold value within a prespecified first time span; and ascertaining whether the acquired rate of rotation exceeds a prespecified rate of rotation threshold value within a prespecified second time span since the exceeding of the vibration rate threshold value.

9 Claims, 3 Drawing Sheets

(51) Int. Cl.
    *G01D 21/02*     (2006.01)
    *G08B 13/16*     (2006.01)
    *E05F 15/40*     (2015.01)
    *E05F 5/02*     (2006.01)
    *E06B 7/28*     (2006.01)
    *G05B 15/02*     (2006.01)

(52) U.S. Cl.
    CPC ............. *G01D 21/02* (2013.01); *G05B 15/02* (2013.01); *G08B 13/08* (2013.01); *G08B 13/1663* (2013.01)

(58) Field of Classification Search
    USPC ....................................................... 340/545.1
    See application file for complete search history.

(56) References Cited

U.S. PATENT DOCUMENTS

| | | | |
|---|---|---|---|
| 7,364,214 | B2 | 4/2008 | Park |
| 2005/0030179 | A1* | 2/2005 | Script .................... G08B 13/08 340/545.1 |
| 2009/0072884 | A1* | 3/2009 | Uhov .................... H03K 17/955 327/517 |
| 2013/0327142 | A1* | 12/2013 | Hogan .................... E05B 45/06 73/493 |

FOREIGN PATENT DOCUMENTS

| | | |
|---|---|---|
| CN | 202745586 U | 2/2013 |
| DE | 102005019846 A1 | 1/2006 |
| DE | 102005001582 | 7/2006 |
| DE | 102004053522 | 8/2006 |
| WO | WO2012/096647 | 7/2012 |

* cited by examiner

DEVICE AND METHOD FOR DETERMINING THE CLOSING STATE OF A HOUSE DOOR OR OF A HOUSE WINDOW

FIELD OF THE INVENTION

The present invention relates to a device and to a method for ascertaining a closing state of a house door or of a house window.

BACKGROUND INFORMATION

In the existing art, various devices are known.

German Published Patent Application No. 10 2004 053 522 describes a monitoring device for transported goods having a carrier via which the monitoring device can be fixed. In addition, the monitoring device described there includes signal-emitting and/or signal-receiving components that are situated on the carrier, and connecting lines between the components situated on the carrier.

German Published Patent Application No. 10 2005 001 582 describes a device and a method for registering the opening of locks of rooms that are to be secured, having a sealing module that contains a sensor, a microprocessor, a memory unit, and a device for wireless communication that can be attached to the lock in such a way that the sensor recognizes a movement.

In addition, the device described there includes an acquisition device and at least one device for wireless communication, a microprocessor, and a memory unit.

The present invention creates a method for ascertaining a closing state of a house door or of a house window , and a device for ascertaining a closing state of a house door or of a house window.

SUMMARY

According to the present invention, an advantageous method is provided for ascertaining the closed door state of a house door or of a house window by evaluating the acceleration data and rotational rate sensor data in order to recognize a closing process of the house door or of the house window in a reliable manner.

The door state of the house door is detected is closed if, for example, the calculated opening angle of the house door is smaller than a predefined angular threshold value. The closing state of the house door or of the house window can here gradually be ascertained in the form of an opening angle of the house door or of a window position of the house window, or non-gradually, in the form "house door open" and "house door closed," or "house window open" and "house window closed."

Moreover, through the present invention an automatic calibration of the opening angle of the house door or of the house window can be carried out, and therefore sensors can be used having a simpler design for the door state recognition, and the influence of measurement value fluctuations and tolerance ranges of the sensors used on the reliability of the system for the door state recognition is minimized.

According to a specific embodiment of the present invention, it is provided that during the first and/or the second time span, a continued acquisition takes place of the rate of rotation of the house door or of the house window using the first acquisition device, and a calculation of an opening angle of the house door or of the house window is carried out on the basis of the acquired rate of rotation, and it is ascertained whether the calculated opening angle is less than the prespecified angular threshold value. In this way, a reliable recognition of the closed state of the house door or of the house window can advantageously be ensured.

According to a further specific embodiment of the present invention, it is provided that after an ascertaining of a closing of the house door or of the house window, the angular threshold value is calibrated. This advantageously makes it possible to minimize an integration error of the first acquisition device.

According to a further specific embodiment of the present invention, it is provided that a time span of up to 3 seconds, or of up to 1.5 seconds, or up to 0.1 seconds, is used as the prespecified first time span. This advantageously makes it possible to acquire a vibration of the house door within the first time span.

According to a further specific embodiment of the present invention, it is provided that a time span of up to 20 seconds or of up to 10 seconds or of up to 5 seconds is used as the prespecified second time span. This advantageously makes it possible to acquire a closed state of the house door within the second time span.

According to a further specific embodiment of the present invention, it is provided that the first acquisition device is fashioned as a rotational rate sensor for acquiring data relating to a currently prevailing rate of rotation of the house door. In this way, a position of the house door can advantageously be ascertained using a simple rotational rate sensor.

According to a further specific embodiment of the present invention, it is provided that the second acquisition device is fashioned as a vibration sensor for acquiring mechanical oscillations of the house door. This advantageously makes it possible to reliably recognize a slamming of the house door.

According to a further specific embodiment of the present invention, it is provided that the computing device is designed to temporally integrate the acquired rotational rates in order to calculate the door opening angle of the house door. This advantageously makes it possible to use compact rotational rate sensors and/or acceleration sensors.

According to a further specific embodiment of the present invention, it is provided that the monitoring device is designed to ascertain the state of closing of the house door on the basis of falling below a prespecified vibration rate threshold value for a prespecified first time span.

The described embodiments and developments can be combined with one another in any manner desired.

Further possible embodiments, developments, and implementations of the present invention also include combinations not explicitly named of features of the present invention described above or in the following relating to the exemplary embodiments.

DETAILED DESCRIPTION

Figure 1:
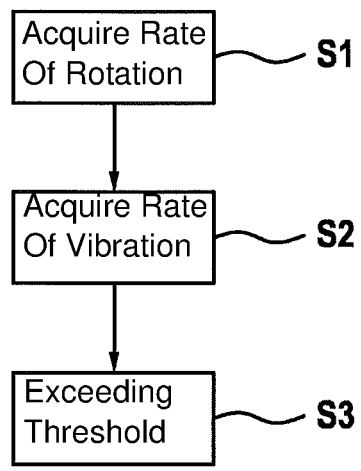
FIG. 1 shows a schematic representation of a flow diagram of a method for ascertaining a state of closing of a house door or of a house window according to a specific embodiment of the present invention.

In the Figures, identical reference characters designate identical or functionally identical elements, components, assemblies, or method steps, if not otherwise indicated.

FIG. 1 shows a schematic representation of a flow diagram of a method for ascertaining a closing state of a house door or of a house window according to a further specific embodiment of the present invention.

As a first method step, there takes place an acquisition S1 of a rate of rotation of house door 10 or of house window 20, using a first acquisition device 1, and a calculation of an opening angle of house door 10 or of house window 20 on the basis of the acquired rate of rotation, and an ascertaining of whether the calculated opening angle of house door 10 or of house window 20 falls below a prespecified angular threshold value.

As a second method step, there takes place an acquisition S2 of a rate of vibration of house door 10 or of house window 20 using a second acquisition device 2, and ascertaining whether the rate of vibration exceeds a prespecified vibration rate threshold value within a prespecified first time span.

In this way, the vibration of house door 10 connected with a closing of house door 10 can advantageously be acquired.

As a third method step there takes place an ascertaining S3 whether the acquired rate of rotation has exceeded a prespecified rate of rotation threshold value within a prespecified second time span since the exceeding of the vibration rate threshold value.

In addition, here a change in the opening angle of house door 10 or of house window 20 following an acquired vibration, i.e. within a prespecified time span, can be ascertained. This advantageously makes it possible to distinguish a vibration caused by knocking on house door 10 from a vibration caused by slamming house door 10, because after knocking on the house door there takes place no change in the opening angle of house door 10.

Here, the prespecified first time span and the prespecified second time span can overlap at least partially.

The method for ascertaining a closing state of the house door or of the house window can also be realized as a check for a presence of the following conditions (a)-(d):

(a) Acquisition of a rate of rotation of a house door 10, a rotational rate sensor recognizing, in a second method step, that the door has been opened and is currently being shut.
(b) The door opening angle is smaller than the predefined threshold.
(c) The acceleration sensor detects the closing process through high-frequency changes in the acceleration signal, arising for example during a closing process or impact of house door 10.
(d) In addition, the opening angle of house door 10 is recognized as stable on the basis of the signals of the rotational rate sensor for a predefined time.

Here, the presence of a prespecified minimum number of conditions, or all conditions (a)-(d), may be required, and this presence can be checked iteratively.

Figure 2:
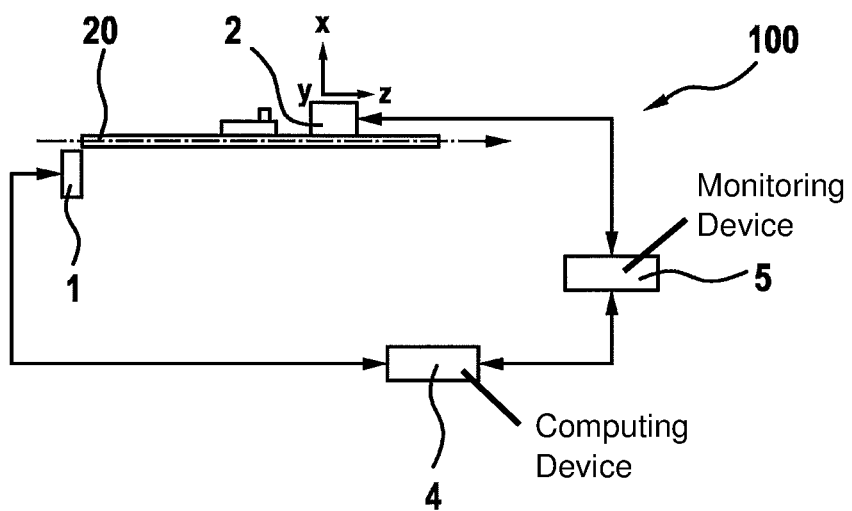
FIG. 2 shows a schematic representation of a device for ascertaining a state of closing of a house door or of a house window according to a further specific embodiment of the present invention.

FIG. 2 shows a device for ascertaining a closing state of a house door or of a house window according to a specific embodiment of the present invention.

Device 100 for ascertaining a closing state of a house door 10 or of a house window 20 includes for example a first acquisition device 1, a second acquisition device 2, a computing device 4, and a monitoring device 5.

Device 100 can be part of a system in the living area, in which devices are used that, due to data networking and remote control capacity, offer additional functions, referred to in English as "eHome," "Smart House," "Smart Home," "Smart Living," and, in German, as "Electronic House," "Networked House," or "Intelligent House." Here, the networking can be accomplished using bus systems (via cable, power line, or radio), or through direct radio connection.

First acquisition device 1 is for example designed to acquire a rate of rotation of house door 10 or of house window 20. For example, the acquired rate of rotation is a rate of rotation of a pivot axis of house door 10. For this purpose, first acquisition device 1 is situated in or on a pivot bearing of house door 10 or on an electric motor of an electric window lifter of house window 20.

Second acquisition device 2 can be designed to acquire a vibration rate of house door 10 or of house window 20. For example, a vibration rate of house door 10 or of house window 20 can be up to 20 g/s at a frequency of the mechanical vibrations of house door 10 or of house window 20 of more than 1 kHz, for a duration of less than 0.5 seconds. Second acquisition device 2 can for example be situated in or alongside house door 10, or in a window fastening of house window 20.

Computing device 4 is coupled to first acquisition device 1, and is designed to calculate an opening angle on the basis of the acquired rate of rotation. This can take place via summation of the continuously acquired rotational rates. If the initial angle of house door 10 or of house window 20 is known, the continuous measurement of the rate of rotation enables a determination of position at each point in time. The position or the opening angle of house door 10, or of the degree of opening of house window 20 in the window frame, can easily be determined therefrom through integration over time by computing device 4.

Monitoring device 5 can be designed to ascertain the closing state of house door 10 or of house window 20 on the basis of a comparison of the calculated opening angle with a predetermined angular threshold value, and on the basis of a comparison of the vibration rate with a vibration rate threshold value. For example, for the opening angle of house door 10 or of house window 20 a predetermined angular threshold value of 5° or of 1° can be specified.

First acquisition device 1 can be fashioned as a rotational rate sensor for acquiring data relating to a currently prevailing rate of rotation of house door 10. The first acquisition device, fashioned as a rotational rate sensor, can measure the speed of rotation or the angular speed along a pivot axis of house door 10. Through integration, the angle about which the house door has rotated within a time span can be derived therefrom.

Second acquisition device 2 can be fashioned as a vibration sensor for acquiring mechanical vibrations of the house door. Second acquisition device 2 can include a piezoceramic element pre-tensioned by a so-called seismic mass.

Through the mechanical vibrations, the mass strikes the piezoceramic element, similar to a hammer in an electric lighter. This causes the piezoceramic element to give off a charge that can be converted into a voltage signal by a corresponding charge amplifier. In this way, second acquisition device 2 can acquire the mechanical vibrations of house door 10.

In addition, computing device 4 can be designed to temporally integrate the acquired rate of rotation in order to calculate the opening angle of the house door.

Monitoring device 5 can be designed to ascertain the closing state of the house door on the basis of falling below a prespecified vibration rate threshold value for a prespecified first time span.

Monitoring device 5 is for example coupled to second acquisition device 2 and/or to computing device 4.

Monitoring device 5 and computing device 4 are for example fashioned as a processor unit or as some other electronic data processing unit, and are coupled to one another in the form of an electronic data processing network.

Monitoring device 5 and computing device 4 are in addition for example fashioned as a microcontroller, which, alongside a processor, also combines units for peripheral functions on a chip.

Differing from the specific embodiment shown in FIG. 2, first acquisition device 1 and second acquisition device 2 can also be configured spatially alongside one another and integrated in a sensor unit.

Figure 3:
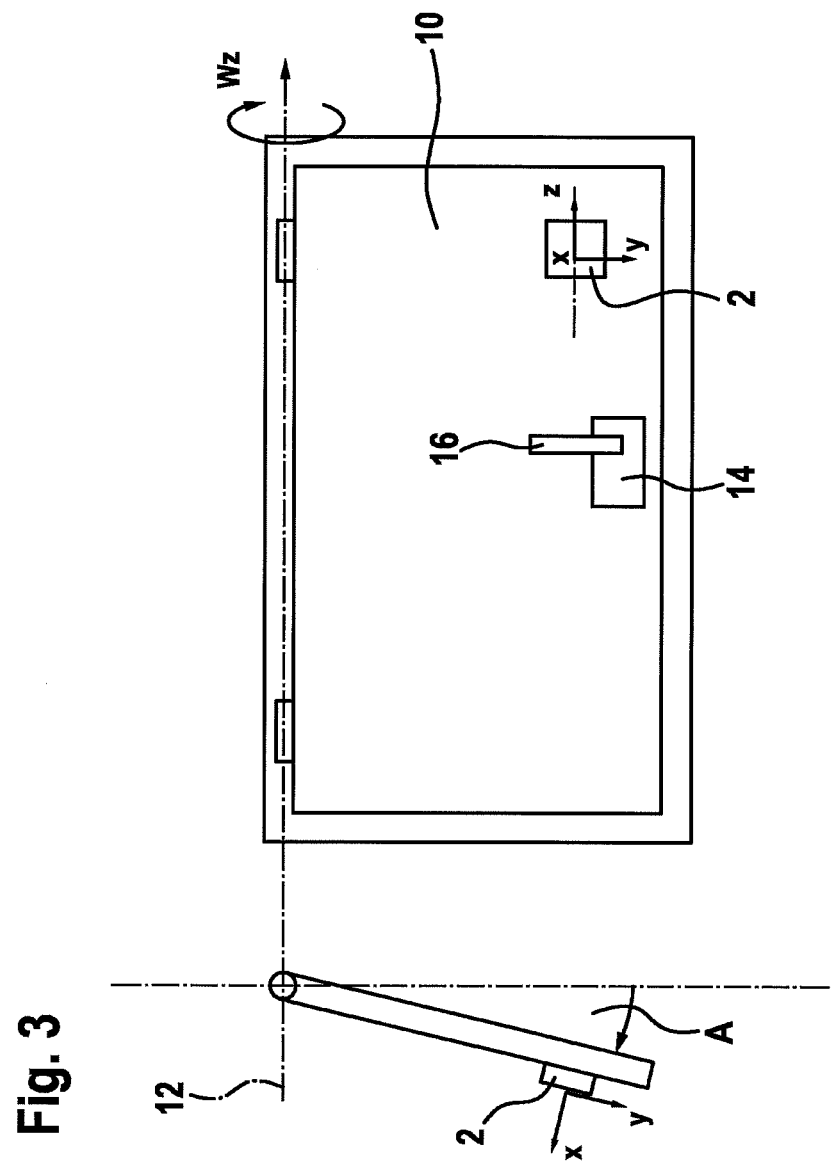
FIG. 3 shows a schematic representation of a house door for the explanation of the present invention.

FIG. 3 shows a schematic representation of a house door for the explanation of the present invention.

House door 10 has for example a door fitting assembly 14 and a door handle 16, as shown in the right portion of FIG. 3 through a side view of house door 10. Here, house door 10 is mounted so as to be capable of rotation about a pivot axis 12 of house door 10, and can have a rate of rotation Wz during the rotational motion.

The closing state of house door 10 is determined by opening angle A, as shown in the left portion of FIG. 3 through a top view of house door 10.

First acquisition device 1 can acquire the opening angle of house door 10 via an integration of acceleration data, and on the basis of a threshold value comparison can acquire the movement of house door 10 in the spatial coordinates for the X, Y, and Z directions. Second acquisition device 2 can be situated directly on the house door for better acquisition of the vibrations.

The acquisition of the opening angle of house door 10 and the vibration of house door 10 can also take place only using second acquisition device 2, if second acquisition device 2 has a combined acceleration and rotational rate sensor. In addition, first acquisition device 1 and second acquisition device 2 can use acceleration and rotational rate sensors in common. Likewise, only second acquisition device 2 may be situated directly on house door 10.

Figure 4:
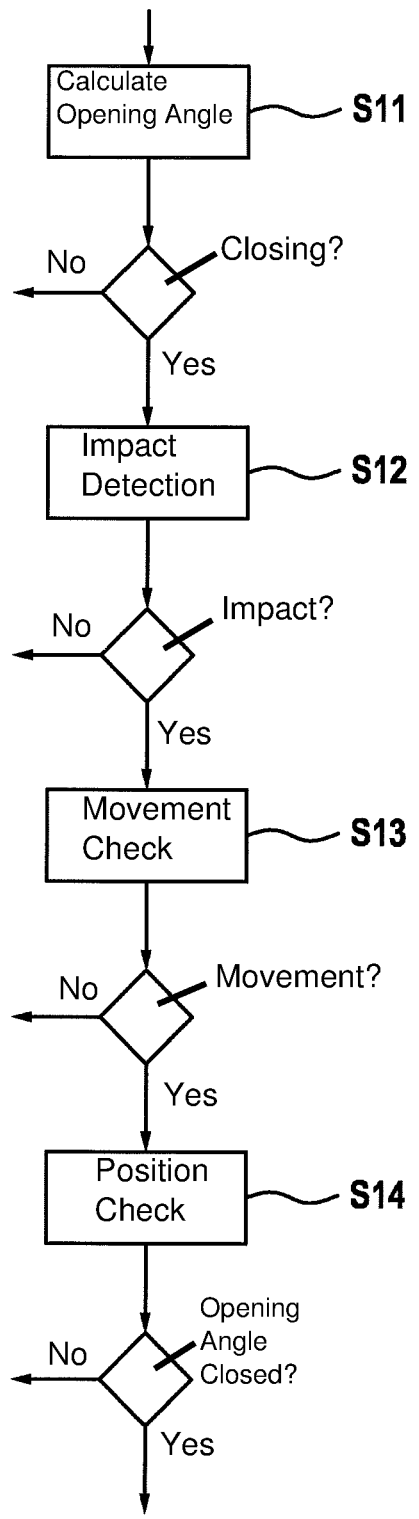
FIG. 4 shows a schematic representation of a flow diagram of a method for ascertaining a state of closing of a house door or of a house window according to a still further specific embodiment of the present invention.

FIG. 4 shows a schematic representation of a flow diagram of a method for ascertaining a closing state of a house door or of a house window according to yet another specific embodiment of the present invention.

The method for detecting the closing process, or for acquiring the closed state, of house door 10 or of house window 20 according to the exemplary embodiment shown in FIG. 3 contains the following steps:

In the first step S11, the opening angle of house door 10 or of house window 20 is calculated. Subsequently it is checked whether house door 10 or house window 20 are currently being closed. If no, house door 10 or house window 20 is considered to be open.

If yes, in second step S12 it is checked whether an impact is detected as a consequence of a slamming of house door 10 or of house window 20, on the basis of monitoring the sensor data.

Subsequently, it is checked whether an impact of house door 10 or of house window 20 is detected. If no, house door 10 or house window 20 is considered to be open.

If yes, in third step S13 it is checked whether house door 10 or house window 20 is being moved for a particular period of time. If yes, house door 10 or house window 20 is considered to be open.

If no, in a fourth step S14 it is checked whether the door position is less than a prespecified opening threshold, i.e. whether the opening angle is approximately closed.

If no, house door 10 or house window 20 is considered to be open, and if yes then house door 10 or house window 20 is considered to be closed.

The method steps can be repeated iteratively or recursively in any sequence. In addition, the individual method steps can be combined with one another in any way as desired.

Although the present invention has been described above on the basis of preferred exemplary embodiments, it is not limited thereto, but rather can be modified in many ways. In particular, the present invention can be changed or modified in many ways without departing from the core idea of the present invention.

What is claimed is:

1. A method for ascertaining a closing state of one of a house door and a house window, comprising:
   acquiring, during a movement of the one of the house door and the house window, a rate of rotation of the one of the house door and the house window using a first acquisition device;
   calculating, during the movement of the one of the house door and the house window, an opening angle of the one of the house door and the house window on the basis of the acquired rate of rotation;
   ascertaining, during the movement of the one of the house door and the house window, whether the calculated opening angle falls below a prespecified angular threshold value;
   acquiring, during the movement of the one of the house door and the house window, a rate of vibration caused by mechanical oscillations of the one of the house door and the house window using a second acquisition device; and
   ascertaining the closing state by ascertaining:
      whether the acquired rate of vibration exceeds a prespecified rate of vibration threshold value within a prespecified first time, and
      whether the acquired rate of rotation exceeds a prespecified rate of rotation threshold value within a prespecified second time span since an exceeding of the vibration rate threshold value.

2. The method as recited in claim 1, wherein during at least one of the first and the second time span, a continuous acquisition takes place of the rate of rotation of the one of the house door and the house window using the first acquisition device, and a calculation of the opening angle of the one of the house door and the house window on the basis of the acquired rate of rotation, and it is ascertained whether the calculated opening angle falls below the prespecified angular threshold value.

3. The method as recited in claim 1, wherein after a closing of the one of the house door and the house window has been ascertained, the angular threshold value is calibrated.

4. The method as recited in claim 1, wherein as the first time span includes one of up to 3 seconds, up to 1.5 seconds, and up to 0.1 seconds.

5. The method as recited in claim 1, wherein the second time span includes a time span of one of up to 20 seconds, up to 10 seconds, and up to 5 seconds.

6. A device for ascertaining a closing state of one of a house door and a house window, comprising:
- a first acquisition device for acquiring, during a movement of the one of the house door and the house window, a rate of rotation of the one of the house door and the house window;
- a second acquisition device for acquiring, during the movement of the one of the house door and the house window, a rate of vibration caused by mechanical oscillations of the one of the house door and the house window;
- a computing device for calculating, during the movement of the one of the house door and the house window, an opening angle on the basis of the acquired rate of rotation;
- an ascertaining device for ascertaining, during the movement of the one of the house door and the house window, whether the calculated opening angle falls below a prespecified angular threshold value; and
- a monitoring device for ascertaining the closing state of the one of the house door and the house window by determining;
  - whether the rate of vibration exceeds a vibration rate threshold value within a prespecified first time span, and
  - whether the acquired rate of rotation exceeds a prespecified rate of rotation threshold value within a prespecified second time span since an exceeding of the vibration rate threshold value.

7. The device as recited in claim 6, wherein the first acquisition device includes a rotational rate sensor for acquiring data relating to a currently prevailing rate of rotation of the one of the house door and the house window.

8. The device as recited in claim 6, wherein the second acquisition device includes a vibration sensor for acquiring mechanical vibrations of the one of the house door and the house window.

9. The device as recited in claim 6, wherein the computing device temporally integrates the acquired rate of rotation in order to calculate the opening angle of the one of the house door and the house window.

* * * * *